United States Patent Office 3,594,281
Patented July 20, 1971

3,594,281
CRYSTALLINE COMBINATION OF L-ASPARAGI-
NASE AND A METAL OR METALLOID AND
METHOD OF ITS MANUFACTURE
Peter P. K. Ho, Carmel, Ind., assignor to Eli Lilly and
Company, Indianapolis, Ind.
No Drawing. Continuation-in-part of application Ser. No.
780,251, Nov. 29, 1968. This application Oct. 2, 1969,
Ser. No. 863,376
Int. Cl. C07g 7/02
U.S. Cl. 195—63
10 Claims

ABSTRACT OF THE DISCLOSURE

A crystalline combination of L-asparaginase and a metal or a metalloid, of high activity as an enzyme and as an oncolytic agent, prepared by crystallization thereof from an aqueous solution containing L-asparginase a soluble metallic or metalloid salt at about pH 6.0–9, and an antisolvent.

CROSS REFERENCE TO PRIOR APPLICATION

This application is a continuation-in-part of application Ser. No. 780,251, filed Nov. 29, 1968, now abandoned.

BACKGROUND OF THE INVENTION

L-asparaginase has now been well established as an effective antitumor agent (see for example Campbell et al., Biochem., 6, 721 (1967)). The enzyme has been obtained from guinea pig serum and has also been isolated from *Escherichia coli* B cells by Mashburn and Wristin, Archiv. Biochem. Biophys., 105, 450 (1964). The latter investigators demonstrated that the enzyme exhibits the same activity when isolated from *E. coli* B as when isolated from guinea pig serum. Schwartz et al., Proc. Nat. Acad. Sci., U.S.A., 56, 1516 (1966), found that *E. coli* cells contained at least two L-asparaginase enzymes, but only one of those which he isolated, designated by Campbell et al., loc. cit. as EC II, demonstrated the anti-tumor activity attributable to L-asparaginase.

The *E. coli* EC II organism can be grown anaerobically by the method of Roberts et al., J. Bacteriology, 95, 2117 (1968), or by a two-stage fermentation as described by Schwartz et al., loc. cit. The Schwartz et al. fermentation procedure can be modified to provide additional glycolyzable carbohydrate prior to the second or anaerobic fermentation step giving a higher yield of the EC II enzyme.

After fermentation by any of the above methods, the cells are harvested by adding a occulating agent, diatomaceous earth or the like, to the fermentation mixture, filtering the mixture, washing the filter cake to remove spent media, and drying the cake. The active enzyme is released from the cells of the cell cake by resuspending the cell cake in water and treating the resulting suspension with high-frequency sound waves. Alternatively, the enzyme can be released from the cells by treatment with lysozyme by the methods of Campbell et al., loc. cit., or by alternately freezing and thawing the aqueous cell cake to disrupt the cell structure.

L-asparaginase has previously been isolated and purified after separation from the *E. coli* cells with which the enzyme is associated by techniques involving a chromatographic absorption of the active fractions on diethylaminoethylcellulose or carboxymethylcellulose columns followed by gradient elution. Schwartz et al., loc. cit.; Campbell et al., loc. cit.; and Roberts et al., J. Bacteriology, 95 2117 (1968).

Further purification has been effected by chromatography over hydroxylapatite, Campbell, loc. cit.; or by electrophoresis on a polyacrylamide base. These purification methods are costly to carry out and afford a low-recovery of the active enzyme in noncrystalline form.

It is an object of this invention to provide a crystalline form of L-asparaginase.

A further object is to provide a crystalline combination of L-asparaginase and a metal or a metalloid of surprisingly high enzymic and oncolytic activity.

A still further object is to provide a method of preparing such a crystalline L-asparaginase.

Further objects of this invention will become clear to those skilled in the art from a further reading of this description.

SUMMARY OF THE INVENTION

This invention relates to a crystalline L-asparaginase preparation.

More particularly this invention pertains to a crystalline combination of L-asparaginase and a metal or a metalloid possessing high enzymic and oncolytic activity and a method for its preparation.

The crystalline combination of this invention is prepared from a crude preparation of L-asparaginase, a soluble metal or metalloid salt, and an antisolvent by the following procedure:

(a) dissolving a crude preparation of L-asparaginase in water;

(b) adding an appropriate water-miscible antisolvent to incipient cloudiness;

(c) adding a sufficient quantity of metal or metalloid salt which is soluble in the solvent-antisolvent mixture, which salt when dissolved in water establishes therein a pH of about 6.0 to about 9, to cause crystallization of the L-asparaginase;

(d) separating the resulting crystals of enzyme. Additional purity of the crystals can be achieved by a repetition of the above steps.

It will be apparent that the steps (b) and (c) above need not be carried out in the order given but can be reversed without violating the spirit of the invention. The resulting combination crystals possess a superior purity and oncolytic activity as hereafter described.

In addition to the high enzymic and oncolytic activity of the crystalline enzyme, the size, smaller surface area, and greater density make the crystals particularly useful for pharmaceutical filling operations. L-asparaginase preparations of the prior art are amorphous powders which tend to be unstable in solution, and are generally supplied as a dry powder accompanied by a second bottle containing the necessary fluid for reconstitution. Due to their high surface area, these amorphous powders tend to pick up impurities and static charges. A powder with such static charges causes many problems in the pharmaceutical industry. When attempts are made to formulate the amorphous material with inert fillers and the like, the material clings to the walls of the apparatus and resists mixing. The material resists being filled into ampoules, capsules, bottles, and the like; it tends to cling to the filling apparatus or become flyaway.

Additionally, powders of this type resist wetting by the liquid added during reconstitution prior to use. The product of this invention effectively overcomes all of the above-mentioned prior-art difficulties.

DETAILED DESCRIPTION OF THE INVENTION

The crystalline combination of L-asparaginase and a metal or a metalloid salt of this invention possesses a specific activity of greater than 350 International Units (I. U.) of L-asparaginase and is prepared from a crude L-asparaginase preparation possessing a specific activity of the order of 60 I. U. by the described method.

The specific activity is a measure of enzymic activity, one International Unit being the quantity of enzyme needed to release 1 micromole of aspartate per minute in the following test.

One to 100λ of undiluted sample of the test solution are added to 1 ml. of aqueous 0.02 M L-asparagine solution and 1 ml. of aqueous 0.2 M sodium acetate buffer (ph 5.0). The aspartate liberated by the resulting enzyme reaction is separated by high voltage electrophoresis in pyridine-acetate buffer at pH 6.3 on a cellulose carrier. For example, twenty λ of the sample are applied onto the buffer-treated Whatman No. 1 paper and the electrophoresis is carried out at 2,000 mv. for 30 minutes. The paper is dried in the oven for 10 minutes, then stained with ninhydrin reagent to give dark blue spots corresponding to aspartate. The density of the spots is determined by a densitometer. Assays on standard concentrations of aspartate and controls containing only the reagents without the added test solution to measure aspartate other than that released by enzyme activity are carried out with each test. Alternatively, the enzyme activity can be assayed by the method of Campbell et al., loc. cit. wherein the enzyme is allowed to react with excess L-asparagine and the released ammonia is reacted with Nessler's reagent. The amount of released ammonia is measured by determination of the change in optical density of the Nessler's reagent.

Preparation of crude L-asparaginase useful in this invention has herein previously been described. Such a procedure can comprise the following steps:

(a) aerobically fermenting an L-asparaginase-producing strain of *E. coli*, of which A.T.C.C. 13706 is a typical culture, in a nutrient medium comprising assimilable carbohydrate, nitrogen, and minerals under conventional conditions for about 5 to 10 hours;

(b) thereafter allowing the fermentation mixture to age under anaerobic conditions for about one hour;

(c) harvesting the cells;

(d) resuspending the cells in water;

(e) treating the resuspended cells with high frequency sound waves to rupture the cell walls; additionally or alternatively, treating the resuspended cells with lysozyme by the method of Cedar and Schwartz, J. Biol. Chem., 242, 3753 (1967) or additionally or alternatively further freezing and thawing the aqueous cell cake to disrupt the cell structure;

(f) adjusting the mixture to pH 5 and filtering to remove the cellular debris;

(g) adjusting the resulting solution to pH 8;

(h) adding to the filtrate, solid ammonium sulfate to a concentration of 45 percent (w./v.) and filtering the resulting mixture (the solid residue being discarded);

(i) adding to the filtrate, solid ammonium sulfate to a concentration of 80 percent (w./v.) and filtering the resulting mixture;

(j) resuspending the solid residue in aqueous $10^{-3}$ M ammonium bicarbonate solution and dialyzing the resulting mixture against water;

(k) adding one volume of ethanol to the aqueous solution of the dialyzed product and filtering the resulting mixture (the solid residue being discarded);

(l) adding a second volume of ethanol to the aqueous filtrate; and filtering the resulting mixture;

(m) dissolving the residue in aqueous $10^{-3}$ M ammonium bicarbonate and freeze-drying the resulting solution;

(n) suspending the resulting powder in water, adding solid ammonium sulfate to a final concentration of 45 percent (w./v.), and filtering (the solid being discarded);

(o) adding additional solid ammonium sulfate to a final concentration of 80 percent and filtering the mixture;

(p) dissolving the residue in $10^{-3}$ M ammonium bicarbonate, dialyzing (water) and lyophilizing the solution to yield the final crude preparation of L-asparaginase.

Use of enzyme purified through step (p) is preferred although the enzyme preparation of step (m) above is also crystallizable by the process of this invention.

By the method of this invention the crude L-asparaginase is first dissolved in water to any desired concentration up to saturation, it being obvious that a relatively large quantity of water would not be advantageous owing primarily to mechanical losses alone.

An antisolvent is then added to the aqueous solution until incipient cloudiness has occurred. Appropriate water-miscible antisolvents for the process of this invention include ethanol, acetone, isopropanol, and the like.

A metal or metalloid salt or an aqueous solution thereof is then added dropwise to the diluted solution of L-asparaginase, causing immediate crystallization of the combination product of this invention. In general, ions of all metals of the periodic table as well as the metalloid ions ammonium and hydrazinium produce a crystalline product with L-asparaginase by the process of the invention, the only criteria for operability appearing to be that the salt must be soluble in water and in the water-antisolvent mixture, and when dissolved in water must impart thereto a hydrogen ion concentration between about pH 6.0 and about 9.

Crystals containing metalloid ions of the group consisting of $NH_4^+$, and $N_2H_5^+$ and the metal ions of the group consisting of $Na^+$, $K^+$, $Li^+$, $Mg^{++}$, $Ba^{++}$, $Sr^{++}$, $Mn^{++}$, $Ca^{++}$, $Zn^{++}$, $Cd^{++}$, $Co^{++}$, $Ni^{++}$, $Cr^{++}$, $Fe^{+3}$, $Pb^{++}$, $Al^{+3}$, or $Cu^{++}$ are the preferred embodiments of the invention. The depot form of the enzyme when crystallized to include $Zn^{++}$ is an especially valuable pharmaceutical form. In general, assuming a molecular weight of 180,000 for the enzyme, about 150 ions per enzyme molecule of alkali metal or metalloid ions, about 30 ions per enzyme molecule of alkaline earth ions, and about 4–6 ions per enzyme molecule of the transition metal ions are needed to effect crystallization of the crystalline combination product.

Although, as has been previously disclosed herein, crystallization begins immediately upon treating the antisolvent-diluted enzyme-containing solution with the metallic or metalloid salt, it is preferable to maximize the yield by allowing the crystallizing solution to stand at room temperature or below until crystallization is substantially complete. The crystalline product can be separated by decantation, filtration, centrifugation, or like separative techniques.

Magnesium L-asparaginase crystals produced by the process of this invention belong to the orthorhombic system and have the following cell parameters.

$a = 153°$ A.
$b = 63$ A.
$c = 127$ A.
$v = 1,224,153$ A.$^3 = 122,415 \times 10^{-21}$ cm.$^3$ In order to determine that the enzyme preparation purified by the process of this invention contains an oncolytic L-asparaginase, the antitumor activity of the product isolated was tested by the following experiment. Gardner lymphosarcoma, a solid non-metastasizing tumor was implanted subcutaneously by trocar into the axillary region of mice. Treatment was begun 24 hours after implantation and the animals were treated by daily intramuscular administration of the enzyme for a total of 10 days. Activity was determined by comparison of the tumor size in test animals to the size in control animals which received no treatment after implantation of the tumor. Each test group consisted of ten animals and the results were expressed as the average of the tumor size observed in each animal. Table I shows the dose-response relationship of L-asparaginase in this test system. In the table, column 1 lists the dose in I. U. per mouse at which the enzyme was given daily, the appropriate quantity of metallo-organic crystalline enzyme being dissolved in sterile saline prior to each daily injection. Column 2 indicates the activity of the drug in the test system, the first number representing the percent reduction in tumor size over the control animals and the number in parentheses showing the number of survivors in each test group at the end of the test period. None of the ten control animals survived the test period.

TABLE I

| Dose, I. U./mouse | Activity |
|---|---|
| 2.0 | 100 (8) |
| 1.0 | 100 (8) |
| 0.5 | 100 (8) |
| 0.2 | 98 (8) |
| 0.1 | 68 (9) |

Similar results were obtained by subcutaneous administration of the enzyme.

EXAMPLE I

Five grams of L-asparaginase as a lyophilized powder with an activity of 81 I. U. per milligram of protein were dissolved in 60 ml. of distilled water. The solution was adjusted to pH 7.0 with 0.1 N sodium hydroxide and dialyzed against aqueous $10^{-3}$ M ammonium bicarbonate solution for about 18 hours. The resulting solution was clarified by centrifugation and the clear, yellow supernatant was brought to a total volume of 80 ml. and a protein concentration of 38 mg. per ml. by the addition of distilled water. The mixture was stirred and 80 ml. of absolute ethanol were added. The solution was cooled to 4° C., held at 4° C. for one hour, then 1 ml. or 1 M potassium phosphate was added. The mixture was cooled to −20° C. and held at that temperature for two hours. A white precipitate of potassium L-asparaginase separated and was isolated by centrifugation at −10° C. The precipitate was agitated with 20 ml. of distilled water and the suspension was clarified by centrifugation. Ethanol was added dropwise to the supernatant until turbidity persisted, and the solution was stored for 18 hours at 4° C., during which time a white crystalline enzyme preparation separated. The crystals were removed by centrifugation. Yield, 51.5 percent; specified activity, 380 I. U. per mg. of protein. Analytical ultracentrifugation showed 99.0 percent homogeneity of product.

EXAMPLE II

L-asparaginase was purified and crystallized by the method of Example 1 except that 1 ml. of aqueous 1 M ammonium sulfate was added to the aqueous ethanol solution of the crude L-asparaginase in place of the potassium phosphate. Yield 61%. Specific activity, 382 I. U./mg. of protein.

EXAMPLE III

The product of Example II was dissolved in 10 ml. of water, 25λ of aqueous 1 M magnesium acetate solution were added, and alcohol was added dropwise until cloudiness persisted. The resulting mixture was allowed to stand for 2 hours at room temperature and overnight at 4° C. The rectangular crystals which formed were collected by centrifugation and decantation, then washed twice with 50% aqueous alcohol. Yield, 55% of theory based upon the original crude L-asparaginase of Example II. Specific activity, 425 I.U./mg. of protein.

EXAMPLE IV

Five grams of L-asparaginase as a lyophilized powder with an activity of 81 I.U. per milligram of protein were dissolved in 60 ml. of distilled water. The solution was adjusted to pH 7.0 with aqueous 0.1 N sodium hydroxide solution and dialyzed against aqueous $10^{-3}$ M ammonium bicarbonate solution for about 18 hours. The resulting solution was clarified by centrifugation and the clear, yellow supernatant was brought to a total volume of 80 ml. and a protein concentration of 38 mg. per ml. by the addition of distilled water. With stirring, 80 ml. of absolute ethanol were added. The solution was cooled to 4° C. and held at 4° C. for one hour, then 1 ml. of 1 M sodium chloride was added. The mixture was cooled to −20° C. and held at that temperature for two hours.

A white precipitate comprising sodium L-asparaginase separated and was isolated by centrifugation at −10° C. The precipitate was agitated with 20 ml. of distilled water; the resulting solution was clarified by centrifugation; and 1 ml. of aqueous 1 M magnesium acetate solution was added to the supernatant. Dropwise addition of ethanol to incipient turbidity followed by storage for 18 hours at 4° C. produced white crystals of magnesium L-asparaginase containing 5 moles of $Mg^{++}$ per mole of enzyme. The crystals were recovered by centrifugation. Yield, 80 percent; specific activity 382 I.U. per mg. of protein.

The crystalline magnesium L-asparaginase was recrystallized by dissolving in water, adding alcohol to incipient cloudiness, and allowing to stand at room temperature for 2 hours and at −4° C. overnight to yield 69% magnesium L-asparaginase with a specific activity of 400 I.U./mg. The purified product also contained 5 moles of $Mg^{++}$ per mole of enzyme.

EXAMPLE V

A crude L-asparaginase product as in Example IV was dialyzed overnight against aqueous $10^{-4}$ M ammonium bicarbonate solution. The dialyzed enzyme solution contained approximately 10 p.p.m. of $Mg^{++}$. Attempted crystallization by the addition of ethanol produced only a non-crystalline precipitate.

One mililiter aliquots of this solution were treated with 20λ of metal or metalloid salt in aqueous 0.1 M solution and alcohol sequentially until crystallization occurred after standing at 4° C. overnight. The amount of metal or metalloid ion necessary to induce crystallization was determined based upon an estimated molecular weight of 180,000 for the L-asparaginase.

The following table lists the results of the several experiments.

| Metal or metalloid cation: | Cation: protein ratio, mole/mole |
|---|---|
| $NH_4^+$ | 150 |
| $N_2H_5^+$ | 150 |
| $Na^+$ | 150 |
| $K^+$ | 150 |
| $Li^+$ | 30 |
| $Mg^{++}$ | 6 |
| $Ba^{++}$ | 6 |
| $Sr^{++}$ | 6 |
| $Ca^{++}$ | 6 |
| $Mn^{++}$ | 6 |
| $Zn^{++}$ | 6 |
| $Cd^{++}$ | 6 |
| $Co^{++}$ | 6 |
| $Ni^{++}$ | 6 |
| $Cr^{++}$ | 6 |
| $Pb^{++}$ | 6 |
| $Cu^{++}$ | 6 |
| $Fe^{+3}$ | 6 |
| $Al^{+3}$ | 6 |

Metals and metalloids were in the form of the acetate, citrate, phosphate, bicarbonate, or sulfate salt thereof.

It can be seen from the above description and specific examples that the process of this invention can be used to purify L-asparaginase from a crude preparation thereof by crystallizing a combination product and thereafter dialyzing the crystalline combination product to remove the metal ions. In this manner a non-metallic product of high purity can be achieved.

I claim:

1. A crystalline combination of L-asparaginase and a member of the group consisting of the metal and metalloid ions.

2. A crystalline combination as in claim 1 wherein the metal ions are the alkali-metal ions.

3. A crystalline combination as in claim 1 wherein the metal ions are the alkaline-earth-metal ions.

4. A crystalline combination of claim 1 of L-asparaginase and an ion of the group consisting of $Na^+$, $K^+$, $Li^+$, $Mg^{++}$, $Ba^{++}$, $Sr^{++}$, $Mn^{++}$, $Ca^{++}$, $Zn^{++}$, $Cd^{++}$, $Co^{++}$, $Ni^{++}$, $Cr^{++}$, $Fe^{+3}$, $Al^{+3}$, $Cu^{++}$, and $Pb^{++}$.

5. A crystalline combination as in claim 4 wherein the metal ion is zinc ion.

6. A crystalline combination as in claim 4 wherein the metal ion is magnesium ion.

7. A crystalline combination as in claim 4 wherein the metalloid ion is ammonium ion.

8. A crystalline combination as in claim 4 wherein the metal ion is potassium ion.

9. A process of preparing the crystalline combination of claim 1 which comprises:

(a) dissolving the L-asparaginase in water;

(b) adding an antisolvent until persistent incipient turbidity;

(c) adding a sufficient quantity of metal or metalloid salt which is soluble in the solvent-antisolvent mixture, which salt when dissolved in water establishes therein a pH of about 6.0 to about 9, to cause crystallization of the L-asparaginase;

(d) separating therefrom the crystalline combination product.

10. A process of preparing the crytalline combination of claim 1 which comprises:

(a) dissolving the L-asparaginase in water;

(b) adding a sufficient quantity of metal or metalloid salt which is soluble in the solvent-antisolvent mixture, which salt when dissolved in water establishes therein a pH of about 6.0 to about 9, to cause crystallization of the L-asparaginase;

(c) adding an antisolvent until persistent incipient turbidity; and (d) separating therefrom the crystalline combination product.

References Cited

FOREIGN PATENTS 8,393    8/1968    South Africa.

LIONEL M. SHAPIRO, Primary Examiner

U.S. Cl. X.R.

195—62, 66, 68